United States Patent

[11] 3,604,931

| [72] | Inventors | Jacob Kastner<br>Downers Grove;<br>Billie G. Oltman, Worth, both of, Ill. |
|---|---|---|
| [21] | Appl. No. | 883,737 |
| [22] | Filed | Dec. 10, 1969 |
| [45] | Patented | Sept. 14, 1971 |
| [73] | Assignee | The United States of America as represented by the United States Atomic Energy Commission |

[54] NEUTRON DOSIMETER INCLUDING A STEP WEDGE FORMED OF AN ALPHA-ATTENUATING MATERIAL
4 Claims, 3 Drawing Figs.

[52] U.S. Cl. ..................................................... 250/83.1 R,
250/83 CD
[51] Int. Cl. ........................................................ G01t 3/02
[50] Field of Search ............................................ 250/83.1,
83 PH, 86, 62, 63, 65, 83 CD

[56] References Cited
UNITED STATES PATENTS

| 2,624,846 | 1/1953 | Tochlin et al. ................ | 250/83 PH |
| 2,715,684 | 8/1955 | Schwarz ....................... | 250/108 |
| 2,933,605 | 4/1960 | Ross ............................. | 250/83.1 |
| 2,938,121 | 5/1960 | Fitzgerald et al. ............ | 250/83 PH |
| 3,335,278 | 8/1967 | Price et al. .................... | 250/83.1 |
| 3,372,275 | 3/1968 | Kocher ......................... | 250/83.1 |
| 3,418,472 | 12/1968 | Evans ........................... | 250/83.1 |

FOREIGN PATENTS

| 76,602 | 5/1919 | Germany ...................... | 250/83 PH |

Primary Examiner—James W. Lawrence
Assistant Examiner—D. C. Nelms
Attorney—Roland A. Anderson ABSTRACT: A neutron dosimeter includes a material which emits alpha particles when bombarded with neutrons, a plastic foil in position to intercept these alpha particles and a step wedge of a material, capable of attenuating the alpha particles, disposed between the alpha-emitting material and the plastic foil. The step wedge varies from zero thickness to such a thickness as will attenuate the most energetic alpha particles formed in the dosimeter to particles having an energy such that the particles form tracks in the plastic foil. Following exposure to neutrons the plastic foil is etched to expose the alpha tracks in the plastic. The location of the tracks in the plastic indicates the energy of the neutrons and the total number of tracks in the plastic indicates the intensity of the neutron flux.

PATENTED SEP 14 1971
3,604,931
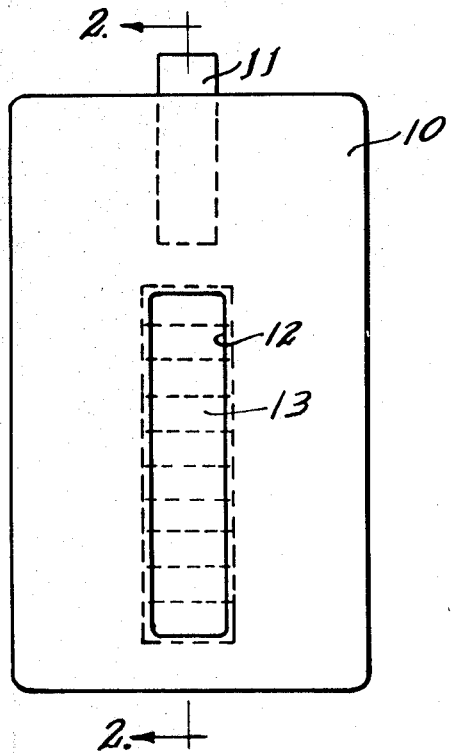
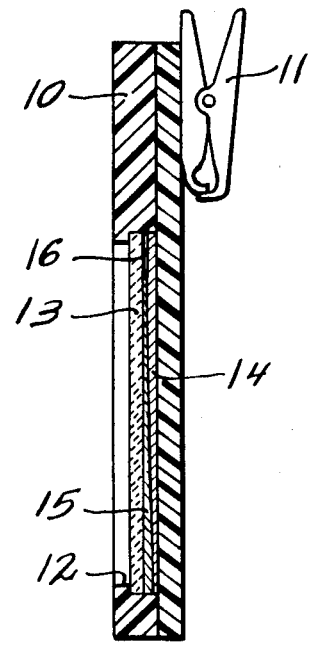
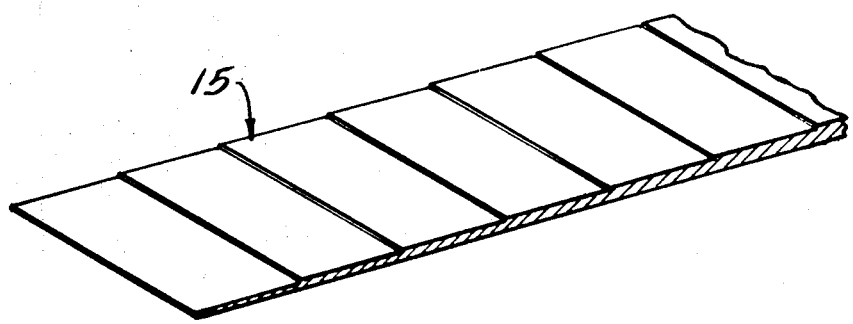
Inventors
Jacob Kastner
Billie G. Oltman
Attorney

NEUTRON DOSIMETER INCLUDING A STEP WEDGE FORMED OF AN ALPHA-ATTENUATING MATERIAL

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a neutron dosimeter and to a method for its use. In more detail, the invention relates to a stable neutron dosimeter responsive to neutrons of all energies while being insensitive to other forms of radiation. In still more details, the invention relates to a personnel neutron spectrum monitor capable of indicating the energy of neutrons incident thereon as well as the total neutron flux.

Dosimeters for the detection and measurement of radiation doses are routinely used in any location where personnel will be or may be exposed to radiation. Dosimeters are used for the detection of ionizing radiation and for the detection of neutrons. Neutron dosimeters presently available do not monitor the entire neutron spectrum to indicate the energy level of the neutrons striking the meter, although they may discriminate broadly between thermal neutrons and fast neutrons. While the energy level of neutrons can be determined by counting and measuring proton tracks in film exposed to neutrons since the length of the track is a function of neutron energy, the technique does not lend itself to personnel radiation exposure monitoring due to latent image fading. In addition, the film used is light-sensitive. Since the relative biological effect of neutron radiation is a function of the neutron energy, it is certainly highly desirable that the energy level of the neutrons striking an individual be known as well as the total number of neutrons to help in determining whether treatment for radiation exposure is necessary and, if so, what treatment should be used.

SUMMARY OF THE INVENTION

According to the present invention, a step wedge of gold or other alpha-attenuating material is interposed between a foil formed of cellulose acetate butyrate, cellulose nitrate or other plastic material and a crystal of lithium–6 fluoride, a button of boron–10, borax formed from boron–10, or other material which emits alpha particles when struck by neutrons. The meter is checked for neutron exposure by etching the plastic foil with sodium hydroxide or other known etchants to expose the alpha tracks in the plastic resulting from neutron events in the lithium–6 or boron–10. The total number of tracks in the foil is a measure of the intensity of the neutron flux and the number of tracks beneath each step of the step wedge indicates the relative proportion of neutrons of different energy levels.

DESCRIPTION OF THE DRAWING

FIG. 1 is a top plan view of a neutron spectrum dosimeter according to the present invention.

FIG. 2 is a vertical section thereof which is not drawn to scale.

FIG. 3 is a perspective view of the step wedge, not drawn to scale.

DESCRIPTION OF THE PREFERRED EMBODIMENT

The neutron dosimeter of the present invention includes a housing 10 having a clip 11 fastened to the back thereof and an opening 12 in the front thereof. Within housing 10 and facing opening 12 is a single crystal 13—or mosaic of single crystals—of lithium–6 fluoride about 2 mm. thick. At the back of housing 10 is a foil 14 of cellulose acetate butyrate (CAB) about 10 or 20 microns thick and disposed between crystal 13 and foil 14 is a step wedge 15 of gold of thickness ranging from ½ micron to 5 microns in steps of ½ micron. Included in crystal 13 is a portion 16 which is not covered with gold. Such an arrangement makes it possible to discriminate among neutrons having energy levels between thermal and 10 mev.

In use, the device is worn on the clothing of anyone who will or may be subjected to neutron radiation. Following subjection to such an environment—or at specified intervals—the dosimeters are collected and the housing removed therefrom. The CAB foil is removed and etched with, for example, 6.25 N sodium hydroxide at 62° for 2½ hours. Etching exposes the alpha tracks therein and the total number of tracks in the foil indicates the intensity of the neutron flux. The location of the tracks in the foil indicates the energy of the neutrons, as will next be explained.

If a neutron strikes a lithium–6 atom, an alpha particle is given off and the energy of the alpha particle will be dependent upon the energy of the neutron. For example, a thermal neutron will cause the emission of an alpha particle having an energy of about 2.0 mev. Neutrons of higher energies will induce the formation of alpha particles of higher energies, since the energy of the neutron is added to that resulting from the radiation process. The energy of the alpha particles will be reduced slightly in the lithium–6 unless a very thin crystal is used and most of the particles induced by thermal neutrons entering the CAB surface will be below about 1.6 mev. We have found that the upper threshold for appearance of alpha tracks in CAB is about 1.6 mev. Thus, at the end of the plastic foil which was not covered by gold, alpha tracks will appear, provided thermal neutrons were incident upon the dosimeter. Alpha particles caused by the incidence of higher energy neutrons upon the dosimeter will not be detected in this portion of the plastic foil since their energy is above the threshold energy for formation of alpha tracks. At the other end of the plastic foil, low-energy alpha particles resulting from the impact of low-energy neutrons upon the detector will not be detected since they will not have sufficient energy to penetrate the relatively great thickness of gold between the lithium–6 fluoride crystal and the plastic foil. Higher-energy alpha particles resulting from the impact of higher-energy neutrons upon the dosimeter will be detected since the energy of these alpha particles will be reduced below the threshold energy for formation of alpha tracks. Similarly, a different energy of neutrons will be detected below each step of the step wedge of gold. Since each neutron striking a lithium–6 atom causes the formation of an alpha particle, the dosimeter is very sensitive and can be used in any location where a measurable neutron flux is or may be present.

A variation on the above-described procedure is to etch the CAB foil in situ; that is, without separating it from the lithium–6 crystal and the gold step wedge. The only tracks that become visible are those that completely penetrate the plastic foil. Useful results can be attained in this manner if the foil is sufficiently thin that a high proportion of the tracks will penetrate the foil.

Although the step wedge may be formed of gold foils of different lengths, the preferred method of forming step wedge 15 is by vapor deposition of gold on the surface of lithium–6 crystal 13. This is done by masking a small portion 16 at one end of the crystal and vapor-depositing ½ micron of gold on the crystal. A wider mask is then used and another ½ micron of gold vapor-deposited on the crystal. This is continued till the desired number of steps are formed in the step wedge. Desirably, the step wedge should contain about 10 steps, each about 1 cm. wide and each differing in thickness from the next step by ½ micron to make it possible to discriminate among neutron energy levels between thermal and 10 mev.

Plastic foil 14 may, in addition to cellulose acetate butyrate, be formed of other plastic materials such as cellulose nitrate (CN). Practically, crystal 13 will be formed of an array or mosaic of single crystals fitted closely together. If crystal 13 is too thick, alpha particles will be lost before they get out of the crystal. It must, however, be thick enough to reduce the energy level of alpha particles formed by thermal neutrons below the threshold for formation of tracks. As has been stated, 2.0 mm. is satisfactory.

Other step wedge material may also be used, although gold is very desirable because of its chemical inertness and because its thickness can be controlled easily. Other candidate materials are aluminum or Mylar—a strong transparent plastic that can be obtained in very thin sheets (the order of a few microns or more).

In addition to lithium–6, other materials which emit alpha particles when struck by neutrons may be used. For example, crystal 13 may be replaced by a button of boron–10 or a button of borax, $Na_2B_4O_7 \cdot 10H_2O$. The boron button must be polished, since otherwise crystals of powder would prick tracks into the plastic. When boron–10 is the target material, the lithium–7 recoil nuclei will also produce tracks.

We have carried out measurements of the upper energy threshold for alpha particles using a thin americium–241 source. One method involving keeping the source-recorder distance fixed and varying the air pressure was used with Diacel CN and another method involving varying the source-recorder distance in air at constant pressure was used with CAB.

For the Diacel CN the source-recorder distance was 5.65 cm. The angle of incidence of the alpha particles on the plastic was ~45°. The source-recorder combination was placed inside a chamber so that the air pressure could be regulated as desired. The main group of alpha particles from americium–241 have an energy of 5.48 mev. The source used had an activity of $2\times10^5$ dis/min. Strips of CN were exposed for 90 minutes at 26° C. and pressure of 30.5, 33.0, 35.6, 38.1, 40.6, 43.2, and 45.7 cm. of Hg. These correspond to incident alpha particle energies at the CN surface of 3.0, 2.8, 2.5, 2.2, 1.9, 1.5, and 1.1 mev., respectively. (Based on the range-energy curve given by M. S. Livingston and H. A. Bethe in the *Reviews of Modern Physics* 9, 245 (1937).). Good tracks were obtained up to an alpha energy of 1.9 mev., and no tracks were visible at all above 2.5 mev.

For the CAB similar measurements indicated that the diameter of the etch pits decreased with increasing particle energy and were no longer visible for alpha particles above ~ 1.6 mev.

Source-recorder combinations were irradiated to slow neutrons in the standard sigma pile at the Argonne National Laboratory. Calibrations were made by sandwiching a disk of CAB between a gold foil and a $LiF^6$ or $B^{10}$ source. These sources had a smooth flat surface so that good contact was possible. The $LiF^6$ crystals were square, 2 cm. on a side and 2 mm. thick. Both sources were "black" to slow neutrons, and were infinitely thick relative to the range of all charged particles produced by slow neutron capture in $Li^6$ or $B^{10}$. The recorder-source combinations were placed in aluminum holders under pressure supplied by a thin layer of sponge rubber to insure good surface contact. In some exposures the packages were placed in cadmium boxes so that a correction for epithermal neutrons could be made.

The unperturbed thermal neutron flux in the standard pile at the position where the packages were placed was assumed to be $(4,100\pm200)$ neutrons/cm.$^2$ sec. The ratio of the Au activity for a given exposure time with and without the $LiF^6$ was $0.42\pm0.02$. The corresponding ratio for the $B^{10}$ was $0.50\pm0.01$. The lack of flux depression in the case of the $B^{10}$ is due to its small mass. Thus, the thermal neutron flux at the $LiF^6$ surface was $(1,720\pm100)$ neutrons/cm.$^2$ sec., and the corresponding flux at the $B^{10}$ was $(2,050\pm100)$ neutrons/cm.$^2$ sec.

The track recording rate for the $LiF^6$ was $(9.65\pm0.23)$ tracks/cm.$^2$ sec. in the neutron flux of 1,720 neutrons/cm.$^2$ sec. The detection efficiency is thus $(5.6\pm0.3)\times10^{13}$ tracks per thermal neutron. The corresponding numbers for the $B^{10}$ are $(26.7\pm1.1)$ tracks/cm.$^2$ sec. in the thermal neutron flux of 2,050, or $(1.30\pm0.08)\times10^{12}$ tracks/thermal neutron.

The above-calculated efficiencies are for thermal neutrons incident over a $2\pi$ solid angle. For thermal neutrons incident isotropically, the above values should be divided by two, since all neutrons incident on the back side of the $LiF^6$ and $B^{10}$ sources are absorbed without producing tracks.

It will be understood that the invention is not to be limited to the details given herein but that it may be modified within the scope of the appended claims.

The embodiments of the invention in which an exclusive property or privilege is claimed are defined as follows:

1. A neutron dosimeter including a housing containing a material capable of emitting alpha particles when bombarded with neutrons, a plastic foil capable of registering etchable tracks from said alpha particles and positioned to receive them, and a step wedge formed of an alpha-attenuating material positioned between the alpha-emitting material and the plastic foil so as to leave a portion of the space between the alpha-emitting material and the plastic foil free of alpha-attenuating material.

2. A neutron dosimeter according to claim 1 wherein said step wedge is formed of gold, the material capable of emitting alpha particles when bombarded with neutrons is lithium–6 fluoride and the plastic foil is selected from the group consisting of cellulose acetate butyrate and cellulose nitrate.

3. A neutron dosimeter according to claim 2 wherein said step wedge contains 10 steps, each differing in thickness from the next by ½ micron.

4. A neutron dosimeter according to claim 1 wherein said step wedge is of gold, the material capable of emitting alpha particles when bombarded with neutrons is boron–10 and the plastic foil is selected from the group consisting of cellulose acetate butyrate and cellulose nitrate.

UNITED STATES PATENT OFFICE
CERTIFICATE OF CORRECTION

Patent No. 3,604,931　　　　　　Dated September 14, 1971

Inventor(s) Jacob Kastner and Billie G. Oltman

It is certified that error appears in the above-identified patent and that said Letters Patent are hereby corrected as shown below:

In column 3, line 47, after "thick." insert the sentence: --The $B^{10}$ was in the form of circular disks, 8 mm in diameter and 2 mm thick.--.

In column 4, line 15, change "$10^{13}$" to --$10^{-3}$--.
　　　　　　line 18, change "$10^{12}$" to --$10^{-2}$--.

Signed and sealed this 2nd day of May 1972.

(SEAL)
Attest:

EDWARD M. FLETCHER, JR.　　　　　ROBERT GOTTSCHALK
Attesting Officer　　　　　　　　Commissioner of Patents